United States Patent [19]

Robinson

[11] 4,446,019
[45] May 1, 1984

[54] MAGNETIC FILTRATION IN A SPIN-ON FLUID FILTER

[75] Inventor: Harold L. Robinson, Minnetonka, Minn.

[73] Assignee: Donaldson Company, Inc., Minneapolis, Minn.

[21] Appl. No.: 419,020

[22] Filed: Sep. 16, 1982

[51] Int. Cl.³ .............................................. B01D 25/06
[52] U.S. Cl. .................................... 210/223; 210/695
[58] Field of Search ...................... 210/222, 223, 695; 55/100, 3; 209/223 R, 223 A, 232

[56] References Cited

U.S. PATENT DOCUMENTS

| | | |
|---|---|---|
| 2,307,954 | 1/1943 | Radke . |
| 2,459,534 | 1/1949 | Kennedy .............................. 210/223 |
| 2,721,659 | 10/1955 | Turcotte . |
| 2,893,561 | 7/1959 | Duzich . |
| 2,926,787 | 3/1960 | Combest . |
| 2,936,893 | 5/1960 | Arkoosh et al. . |
| 2,980,257 | 4/1961 | Paton . |
| 3,342,339 | 9/1967 | Riolo . |
| 3,480,145 | 11/1969 | Gladden . |
| 3,890,232 | 6/1975 | Combest et al. ..................... 210/223 |
| 4,218,320 | 8/1980 | Liaw . |

Primary Examiner—Frank Sever
Attorney, Agent, or Firm—Merchant, Gould, Smith, Edell, Welter & Schmidt

[57] ABSTRACT

In a spin-on fluid filter assembly (10), means for magnetic filtration of ferrous-type particles upstream of the filter element is provided. The magnetic filtration means may include magnetizing the attachment plate (16) of the spin-on filter (12) and portions of the element housing (24). Magnetic spring clips (45) may be secured near the fluid inlet openings (30) in the attachment plate (16). A magnetic ring-like element (40) may also be secured adjacent the arrangement of inlet openings (30) in the plate (16). The invention produces magnetic force fields which attract and retain at the area of the attachment plate ferrous-type particles prior to the entry of the contaminated fluid into the filter element.

5 Claims, 7 Drawing Figures

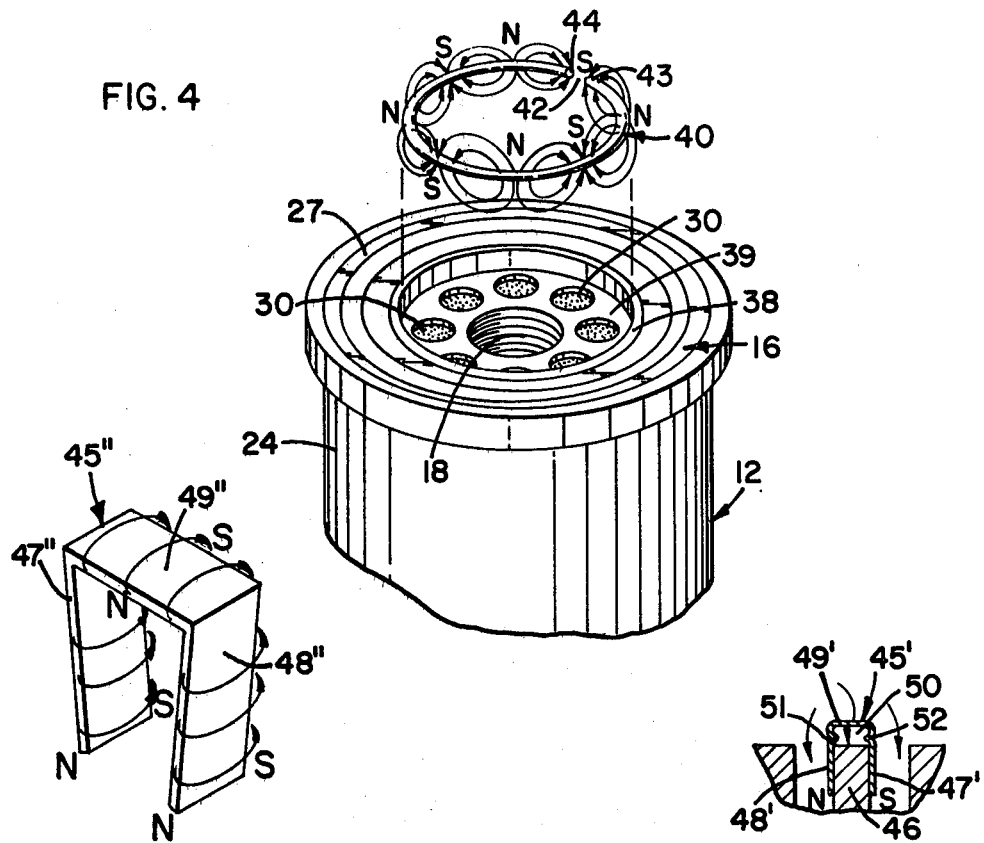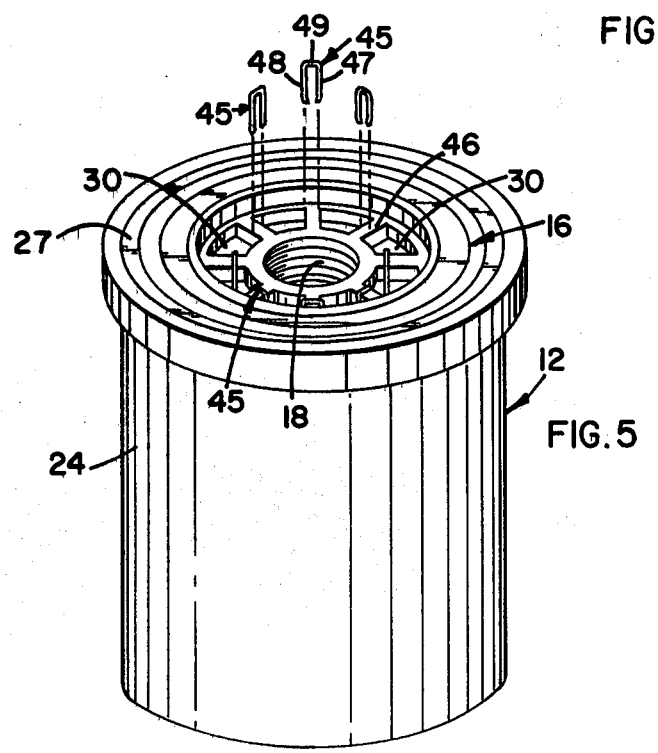

MAGNETIC FILTRATION IN A SPIN-ON FLUID FILTER

TECHNICAL FIELD

The present invention relates to fluid filters having magnetic filtration capabilities, and more particularly, to a spin-on filter assembly capable of filtering ferrous particles upstream of the filter element media.

BACKGROUND

Magnetic filters are known in the art and developments in the art continue in light of industry needs and demands. Most prior art spin-on magnetic filters are less than satisfactory in their performance in that the location of the magnetic filtration means is typically downstream from the filter media and/or not directly in the fluid flow. Furthermore, the great majority of prior art filter elements having magnetic filtering capabilities are not of the spin-on type, and thus a significant portion of the present day filter market has not been directly developed with respect to magnetic filtration.

The present invention is directed particularly to spin-on fluid filter elements. The need for magnetic filtration is especially critical in the areas in which spin-on fluid filters are used in that stray ferrous particles can do significant damage to a fluid circuit, e.g. a hydraulic circuit, and they can also damage the finer filter media thereby compromising the overall filtering capacity of the element. Thus, not only is there the problem of providing magnetic filtration in a spin-on fluid filter assembly, but there is also the problem of achieving such filtration before the magnetic particles reach the filter media. The present invention accomplishes these objectives in a manner which is commercially feasible and universally applicable to virtually all types of spin-on fluid filter elements.

SUMMARY

The present invention provides means for producing magnetic force fields on a spin-on fluid filter element at a location upstream of the filter media which is contained within the element. Preferably the magnetic force fields are created by magnetizing a metal portion of the filter element where the inlet for the fluid entering the element is located.

Additionally, or in the alternative, a magnetic element, constructed and designed to snap-engage a portion of the element which contains the fluid inlet, may be provided to produce additional magnetic force fields. Another embodiment of the invention may include magnetic clamps or spring clips which are secured to individual web portions between adjacent fluid inlets of the element.

As contaminated or dirty fluid flows into the filter element inlet, it passes through the magnetic force fields produced at the fluid inlets prior to entering the element. Any particles contained in the fluid which are attracted by the magnetic force fields may be removed at that location and thus prevented from entering the element and causing damage to the filter media. When the filter element is no longer useable and requires replacement, the magnetic clips and/or the snap-on element may be removed, cleaned and reused on a new element. The invention may also simply be disposed of with the used element, thus saving time and cost of cleaning.

BRIEF DESCRIPTION OF THE DRAWINGS

FIG. 4 is a perspective view of the upper portion of a spin-on filter element and a second embodiment of the present invention.

FIG. 5 is a perspective view of a spin-on filter element, as seen from above, illustrating a third embodiment of the present invention.

FIG. 6 is a cross-sectional view of a fourth embodiment of the present invention.

FIG. 7 is a perspective view of a fifth embodiment of the present invention.

DESCRIPTION OF THE PRESENT INVENTION

Figure 1:
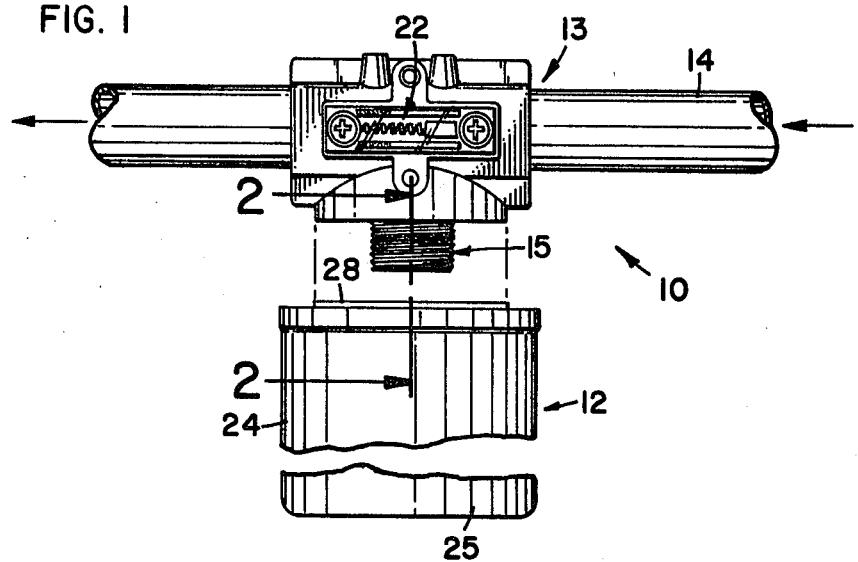
FIG. 1 is an exploded, elevational view of a spin-on filter assembly in which the present invention may be used.

In the drawings like reference numerals are used throughout the several views to indicate the same or like elements. Referring now to the drawings, the environment in which the invention is intended to be used is in a spin-on fluid filter assembly. This is a fluid filter assembly well-known by those skilled in the art and one example of this type of assembly 10 is shown in FIGS. 1 and 2.

Figure 2:
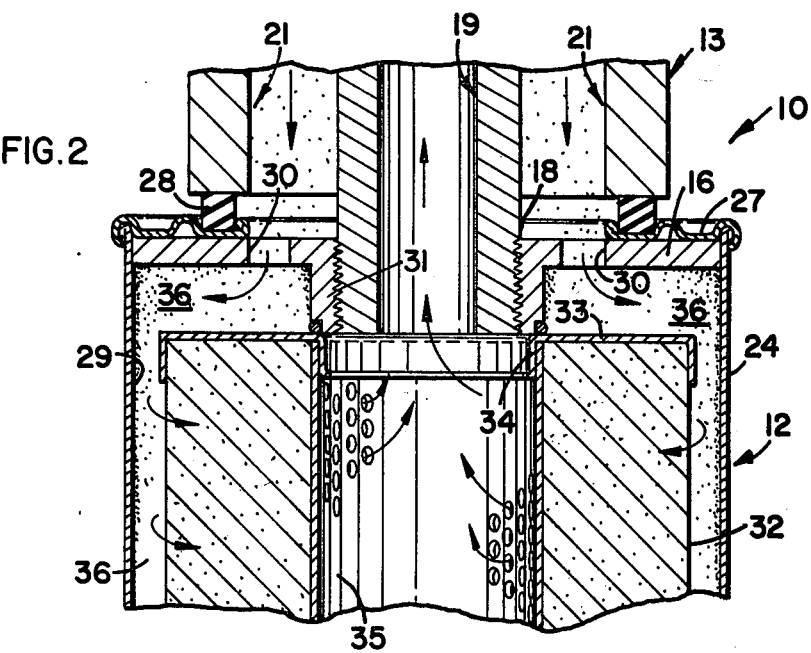
FIG. 2 is a cross-sectional view of the spin-on filter assembly as seen generally along lines 2—2 in FIG. 1.

In FIG. 1 the filter 12 is shown in unattached relationship to the filter head or fluid source 13. The two parts as assembled in a sealed, attached relationship are illustrated in cross-section in FIG. 2. The filter head 13 is positioned in a fluid line 14 which brings contaminated or dirty fluid, such as lubricating oil or hydraulic fluid, to the filter assembly 10 for filtration and then carries filtered, clean fluid from the assembly back to a machine or the remainder of the circuit for reuse. The filter head 13 is a top mounting unit having a hollow column 15 extending downwardly with external threads. This column 15 is threaded onto a spin-on filter 12 having an attachment plate 16 at one end in which a centrally located opening 18 contains an inwardly extending column having threads on the internal wall which match those of the filter head column 15. The filter head column 15 is constructed to provide fluid communication between the filter 12 and the portion of the fluid line 14 which transfers clean, filtered fluid back to the machine for reuse. The column 15 thus provides as a filter fluid outlet 19 in the filter head 13. An annular inlet passage 21 for the unfiltered fluid is located in the body of the head 13, around the periphery of the central outlet 19. Also provided on the filter head 13 is a visual indicator 22 which conveys information as to the loaded condition of the filter element, e.g. when the spin-on filter is clogged and should be replaced.

In a preferred embodiment, the spin-on filter 12 includes a cylindrical housing or canister 24 having a closed bottommost end 25. The top end of the canister 24 includes a rigid, stamped or die-cast attachment plate 16. The plate 16 may be made from steel, iron, aluminum, etc. An uppermost portion 27 of the canister extends along and overlaps a portion of the attachment plate 16 as can be seen in FIG. 2. The overlapping portion 27 of the canister or housing 24 lies between a sealing gasket 28 and the attachment plate 16 which is welded or otherwise suitably secured to the interior wall 29 of the canister 24. The attachment plate 16 is a relatively flat disk-shaped element having an inlet portion with openings 30 therein designed so as to be in fluid communication with the annular inlet passage 21 of the filter head 13. In the alternative, the attachment plate may be dish-shaped rather than flat. The filter head inlet passage 21 is generally larger than the combined inlet openings 30 in the attachment plate 16. A generally central opening 18 in the attachment plate 16 includes an internally threaded column 31 extending downwardly from the filter element top and towards the filter element closed end. The threads on the attachment plate column 31 are designed to mate with those on the filter head column 15 to secure the two parts together.

A cylindrical element 32 of filter media, e.g. pleated filter paper, is contained within the canister 24 and is in fluid communication with the outlet opening 18 of the attachment plate 16 and thereby also with the outlet 19 of the filter head 13. The element 32 has a generally hollow interior. An end cap 33 is secured to each end of the filter element 32. The upper end cap 33 includes a downwardly extending centrally located annular portion 34 overlapping the upper portion of a perforated screen 35 which defines the central hollow interior of the filter media. The screen 35 provides a means for the element 32 to withstand the pressure differential created across the media. The end caps are suitably bonded to the respective ends of the filter media. The outside diameter of the filter element 32 is less than the inside diameter of the canister 24, and the top of the filter element is held in spaced apart relationship with respect to the underside of the attachment plate by the threaded column connection. Thus an annular space 36 is defined in the canister 24 between the outermost periphery of the filter element and the inner wall 29 of the canister 24 and between the element end cap 33 and the attachment plate 16.

Contaminated oil or fluid flows along the fluid line 14 into the filter head 13 where it travels by way of the inlet passage 21 into the filter 12. The contaminated oil first enters the annular space 36 within the canister 24 in a downwardly direction within the space 36 and then proceeds inwardly and generally transversely through the filter element 32. The media then filters out the contaminants contained in the fluid passing therethrough. Clean fluid then exits the media through the perforated screen 35 and is drawn upwardly along a generally vertical axis through the connected central openings 18,19 of the element and the filter head attachment column. The clean fluid travels from the filter head outlet port 19 into the fluid line 14 for return to the machine for reuse.

The contaminated fluid may be an oil such as is used in hydraulic circuits. It is not uncommon in such hydraulic circuits to find small chips or scrappings of steel or iron which have broken off from machine parts and enter the flow of oil. These types of contaminants can do serious damage to other parts of the machine if left in the fluid and thus must be removed before the filtered oil is returned to the machine for reuse.

The prior art methods for removing the metal chips, scrappings and/or particles from the fluid have been to simply allow the particles to become lodged in the filter media or to magnetically remove the particles at a location downstream from where the fluid enters the filter element canister. Even with the latter method, damage may occur to the filter media, and thus the filtering capacity of the media is compromised and the life of the element is reduced.

With the present invention, magnetic filtration is accomplished without any resulting damage to the filter media. In the present invention, means, near the inlet portion of the element and upstream from the filter media, is provided for producing one or more magnetic force fields at the attachment plate. Contaminated fluid passing from the filter head 13 to the filter 12 must pass over and through portions of the attachment plate 16 before it enters the canister 24. Magnetic force fields produced in this area of the fluid passage attract the metal or ferrous type particles and cause their removal from the fluid before the fluid passes into the filter canister 24. This is an essential part of the invention in that magnetic filtration occuring upstream from the filter media will increase the intended non-ferrous contaminant holding capability of the filter media. This in turn will result in increased filter life.

A number of embodiments of the present invention are possible. The most simple embodiment requiring no material add-on is the use of a steel or iron attachment plate 16 which is magnetized so that magnetic force fields are produced along the entire surface of the plate 16. Ferrous particles may then be collected along the entire surface of the plate as the fluid flows over the plate 16 and into the various inlet openings 30. If the canister 24 is made from a material such as sheet steel, it too becomes magnetized, to a certain extent, during the process of magnetizing the attachment plate 16. The magnetized portions of the canister 24, directly contacting the contaminated fluid, thus provide secondary areas of magnetic filtration.

Figure 3:
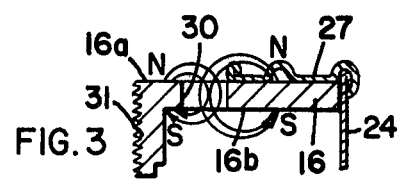
FIG. 3 is a cross-sectional view of a portion of the assembly shown in FIG. 2 illustrating one embodiment of the present invention.

In FIG. 3, the preferred magnetic polarity of the attachment plate 16 is schematically illustrated. The upper side 16a of the attachment plate is designated as the north pole, N, with the underside 16b designated as the south pole, S. In this manner, the fields of magnetic force overlap and extend through each of the inlet openings 30 where the contaminated fluid must pass. Magnetic filtration provided by this embodiment of the invention requires no servicing and is disposed of with the spin-on filter element.

A second embodiment of the invention is illustrated in FIG. 4. In certain spin-on filter elements a shoulder portion 38 extending around the periphery of the circular arrangement of inlet openings 30 is provided. The outlet opening 18 in the filter element remains centrally located on the attachment plate 16 of the filter 12 as discussed previously. Between the shoulder 38 and the outermost part of each inlet opening 30 is a relatively flat, solid, annular surface area 39. It is in this area that the second embodiment of the invention is positioned for magnetic filtration of the entering dirty fluid. Preferably, the second embodiment is a non-continuous, flexible ring-like element 40 having an outside diameter slightly greater than the inside diameter of the attachment plate shoulder 38. With this construction and design, the element may be snapped into position on the annular surface area 39 and held against the shoulder 38 as the ring 40 flexes to its original diameter. The non-continuous design of the ring element 40 provides a gap 42 between the free ends 43,44 of the element. The element is reduced along this gap 42 in its diameter as it is snapped into position upon the attachment plate 16.

The element 40 may be made from any metal material which is flexible and is capable of retaining magnetic properties. The preferred method for magnetizing the element may be any suitable apparatus which will allow the creation of several separate areas of polarity along its full length, thus creating a magnetic force field adjacent each of the individual inlet openings 30. In FIG. 4, this type of magnetic polarity is schematically illustrated by north and south pole designations, N, S, at various locations along the entire length of the element 40. The resulting polarities provide magnetic attraction over the full inlet area of the attachment plate 16 such that entering contaminated fluid must pass through at least one force field on its passage to the filter media.

The magnetic ring-like element 40 is inexpensive to manufacture and may be disposed of along with the clogged filter, or it may be cleaned and reused in another spin-on filter. It may be used on all types of spin-on filter elements having a raised shoulder portion and is not dependent on the magnetic retention properties of any other portion of the filter element.

Referring now to FIG. 5, a third embodiment of the present invention is constructed and designed as a spring clip 45 which is positioned on a web portion 46 of the attachment plate 16 which separates adjacent individual inlet openings 30. Again, as in the other embodiments, the threaded outlet opening 18 for clean fluid is centrally located in the attachment plate 16. In FIG. 5, one arrangement of web portions 46 on the attachment plate for a spin-on filter element is shown. Secured to each web portion 46 is a magnetic spring clip 45. Three types of spring clips are illustrated for this embodiment of the invention, however it will be appreciated that the invention is not limited to these particular three designs.

In FIG. 5, the simplest spring clip is a length of metal wire having a U-shape. A pair of clamp-like legs 47,48 is connected at respective upper ends of each leg by a transverse section 49 of the wire. The transverse section or connecting portion 49 of the clip 45 is positioned so as to rest upon the top surface of the web portion while each of the legs 47,48 extends downwardly along one of the two sides of the web portion 46 towards the interior of the filter element. The legs of the clip are designed so as to normally flex inwardly towards each other. Thus, when placed upon a web portion 46 of the attachment plate 16, the clip 45 will be secured in its position by the natural tendency of the clip legs 48,49 to move inwardly towards each other, thereby pressing inwardly against the side surfaces of the respective web portion holding the clip securely in place.

The preferred magnetic polarity for the clip is created with one side of the clip 45 being a north pole and the other side a south pole (see FIG. 7 for a schematic illustration of this type of polarity). In this manner, the number of magnetic force fields will be maximized along the full length of the clip, thus providing the greatest amount of magnetic force fields possible for attracting the ferrous particles from the fluid as it passes from the filter head into the attachment plate inlet openings 30.

A modification of the third embodiment is shown in cross-section in FIG. 6. The spring clip 45', discussed in the foregoing paragraph, is modified to provide an upper open area 50 above the web portion 46. The connecting portion 49' of the clip 45' does not lie flush with the top surface of the web portion; instead it is held above the attachment plate a short distance by portions of each leg 47',48' being bent inwardly towards each other to create a pair of notched or ledge portions 51,52 with the bottom surface of each portion resting upon the web portion 46. In this embodiment, the fluid will not only flow over the outer surfaces of the clip 45', but will also flow in a defined open area between the raised connecting portion 49' of the clip 45' and the top surface of the web portion 46. This will provide a greater surface area for magnetic filtration of the entering contaminated fluid. The polarity of the spring clip 45' is the same as the first discussed clip 45 in that one side of the clip has a north pole designation, N, and the other side of the clip a south pole designation, S. See FIG. 6.

Another modification of the third embodiment is illustrated in FIG. 7 and is essentially a spring clip 45" made from a flat, rectangular piece of metal rather than a piece of wire. The surface area of the magnetic spring clip is greater in that the width of the clip is thus increased by the dimension of the piece of metal. The legs 47",48" of the clip 45" serve as clamping means to retain the clip on the web portion 46 as discussed above. The magnetic polarity of the clip is designated north, N, along one side and full length of the clip and south, S, along the other side and full length of the clip 45". Examples of the resulting magnetic force fields are shown in FIG. 7.

The use of magnetic spring clips on a spin-on filter attachment plate allows selective placement of the clips upon the attachment plate and in any number desired by the user. The clips may be used with either a magnetized attachment plate to enhance the magnetic filtration capability or may be used alone on an attachment plate having no other magnetic properties. The clips may be cleaned and reused in a new filter or may be disposed of with the old filter thus saving time and the cost of cleaning.

It should be clear from the foregoing discussion that the invention is directed to specific use on a spin-on fluid filter to achieve magnetic filtration of a contaminated fluid upstream of the filter media contained in the filter. The invention has universal application to commercially available spin-on filters and thus requires no structural modification of the commercially available filter. The invention increases the contaminant holding capability of the filter element by collecting the ferrous particles upstream of the fine filter media thereby allowing the media to collect greater amounts of non-ferrous particles and thus prolonging the life of the fluid filter element and preventing damage to the media.

Another important advantage of the present invention over known prior art methods and devices for magnetic filtration is that when the filter element becomes clogged magnetic filtration will continue. For example, the inlet passage 21 may have an angular surface in its uppermost portion which causes the incoming oil to flow downward towards the magnetic elements of the various embodiments of the present invention. Even under the condition of a completely clogged filter element and the oil or fluid is flowing through a bypass valve, the angular portion of the top of the inlet passage 21 will cause a large percentage of the incoming oil or fluid to be directed downwardly at a high velocity. The velocity imparted to the higher density ferrous particles which may be contained in the incoming fluid will cause such particles to continue downwardly towards the magnetic elements, discussed above, and become attracted to and trapped thereby. An important advantage of the present invention is that the location of the magnetizing means upstream from the filter element, and particularly at the attachment plate, provides a proportional amount of magnetic filtration, even though the filter element is completely bypassed, as the contaminated fluid passes through the bypass valve, the filter head, and back into the fluid line. Thus, even though all contaminants cannot be removed when the filter element is clogged, there can continue to be removal of a portion of the ferrous particles which would otherwise cause irreversible damage if allowed to remain in the fluid and thus carried back to the machine.

In conclusion, the present invention provides means for magnetizing an area of a spin-on filter near the fluid inlet for the filter. This allows magnetic filtration of the fluid upstream from the filter media and prolongs the life of the filter element. The invention may include the use of magnetic clips, snap-engaging magnetic ring elements, and/or magnetizing the attachment plate itself. Of course, modifications of the embodiments described and illustrated for the present invention will be apparent to those skilled in the art. Thus, the invention is intended to be limited only by the scope of the claims which follow.

What is claimed is:

1. In a spin-on fluid filter having a housing, means for securing said filter to a fluid source, and filter media contained in said housing, said securing means including an attachment plate having an upper surface area positioned towards said fluid source, a bottom surface area positioned towards said filter media, fluid outlet means and fluid inlet means for providing fluid flow communication between said fluid source and said filter media, and a plurality of fluid impervious web portions, wherein the improvement comprises:

means for providing magnetic filtration capability to said spin-on fluid filter, said fluid filter otherwise not having magnetic filtration capability, said means including a plurality of clips each constructed and arrange to be removably attached to one of said web portions, each of said clips being constructed from a magnetizable material and including at least one magnetic force field, whereby fluid entering said housing from said fluid source passes through said at least one magnetic force field prior to contacting said filter media.

2. In the spin-on filter of claim 1 said improvement further comprising each of said clips having an upper portion spaced apart from said respective web portion, said upper portion and said respective web portion defining therebetween a fluid flow area such that fluid flow entering said housing passes over one of said clips and through said respective fluid flow area and at least one magnetic force field.

3. In a spin-on fluid filter having a housing, means for securing said filter to a fluid source, and filter media contained in said housing, said securing means including an attachment plate having an upper surface area positioned towards said fluid source, a bottom surface area positioned towards said filter media, and including fluid outlet means and fluid inlet means for providing fluid flow communication between said fluid source and said filter media, wherein the improvement comprises:

means for providing magnetic filtration capability to said spin-on fluid filter, said fluid filter otherwise not having magnetic filtration capability, said means including said attachment plate being constructed from a magnetizable material and having at least one magnetic force field extending over substantially all of said surface area thereof, whereby fluid entering said housing from said fluid source passes through said at least one magnetic force field prior to contacting said filter media.

4. In the spin-on fluid filter of claim 3, said improvement further comprising:

said attachment plate having a plurality of fluid impervious web portions; and at least one clip constructed and arranged to be removably attached to one of said web portions, said clip being constructed from a magnetizable material and including at least one magnetic force field, said clip further having an upper portion spaced apart from said respective web portion, said upper portion and said respective web portion defining therebetween a fluid flow area such that fluid flow entering said housing passes over said clip, through said fluid flow area and said at least one magnetic force field.

5. In the spin-on fluid filter of claim 3 said improvement further comprising:

said housing being constructed from a magnetizable material and a portion of said housing having at least one magnetic force field such that said housing portion provides secondary magnetic filtration and said magnetized attachment plate provides primary magnetic filtration.

* * * * *